United States Patent
Samuelsson (10) Patent No.: US 10,551,472 B2
(45) Date of Patent: Feb. 4, 2020

(54) ABILITY TO INTERACT WITH PASSIVE BEACON RECEIVER DEVICES IN A SHORT-RANGE WIRELESS BEACON COMMUNICATION SYSTEM

(71) Applicant: CRUNCHFISH PROXIMITY AB, Malmö (SE)

(72) Inventor: Joachim Samuelsson, Helsingborg (SE)

(73) Assignee: CRUNCHFISH AB, Malmö (SE)

( * ) Notice: Subject to any disclaimer, the term of this patent is extended or adjusted under 35 U.S.C. 154(b) by 0 days.

(21) Appl. No.: 15/778,389

(22) PCT Filed: Nov. 21, 2016

(86) PCT No.: PCT/SE2016/051152
§ 371 (c)(1),
(2) Date: May 23, 2018

(87) PCT Pub. No.: WO2017/091132
PCT Pub. Date: Jun. 1, 2017

(65) Prior Publication Data
US 2019/0250239 A1    Aug. 15, 2019

(30) Foreign Application Priority Data
Nov. 23, 2015   (SE) ...................................... 1551516

(51) Int. Cl.
*H04B 5/00*    (2006.01)
*G01S 1/04*    (2006.01)
*H04W 4/80*    (2018.01)

(52) U.S. Cl.
CPC .............. *G01S 1/042* (2013.01); *G01S 1/045* (2013.01); *H04W 4/80* (2018.02)

(58) Field of Classification Search
CPC ........... H04W 4/80; G01S 1/042; G01S 1/045
(Continued)

(56) References Cited

U.S. PATENT DOCUMENTS

| 7,583,644 B2 * | 9/2009 | Morioka | H04W 74/002 370/338 |
| 7,668,243 B2 * | 2/2010 | Ho | H04N 21/4305 370/329 |

(Continued)

FOREIGN PATENT DOCUMENTS

EP    2991041 A2    3/2016

OTHER PUBLICATIONS

Office action from corresponding Swedish application No. 1551516-6 dated May 13, 2016, all enclosed pages cited.

(Continued)

*Primary Examiner* — April G Gonzales
(74) *Attorney, Agent, or Firm* — Burr & Forman, LLP (57) ABSTRACT

A beacon transmitter device ($BTD_1$; 700; 900) is disclosed. The beacon transmitter device comprises a controller (710; 910) and a short-range wireless beacon transmitter (732; 932). The controller is configured to cause a first transmission (S12) of a short-range wireless beacon signal ($BA_1$) by the beacon transmitter, the beacon signal identifying a beacon region. The controller is also configured to wait during a beacon delay time period (BDTP), and then cause a second transmission (S32) of the short-range wireless beacon signal ($BA_1$) by the beacon transmitter. The beacon delay time period (BDTP) is sufficiently long to allow a short-range wireless beacon receiver device ($P_1$), when being in a passive mode, being in range of the beacon region and having received the first transmission of the beacon signal, to receive and react (S34) on the second transmission of the beacon signal.

8 Claims, 9 Drawing Sheets

(58) Field of Classification Search
USPC .................................................. 455/41.1
See application file for complete search history.

(56) References Cited

U.S. PATENT DOCUMENTS

| | | | | |
|---|---|---|---|---|
| 9,282,582 | B1* | 3/2016 | Dunsbergen | H04W 48/12 |
| 2005/0025092 | A1* | 2/2005 | Morioka | H04W 74/002 |
| | | | | 370/328 |
| 2005/0143145 | A1* | 6/2005 | Maekawa | G06F 1/3209 |
| | | | | 455/574 |
| 2011/0128129 | A1* | 6/2011 | Graczyk | G06K 17/0022 |
| | | | | 340/10.33 |
| 2013/0279382 | A1* | 10/2013 | Park | H04W 74/085 |
| | | | | 370/311 |
| 2014/0220883 | A1* | 8/2014 | Emigh | H04H 20/61 |
| | | | | 455/3.01 |
| 2015/0092642 | A1* | 4/2015 | Geboff | H04L 69/329 |
| | | | | 370/311 |
| 2015/0271801 | A1* | 9/2015 | Matsuo | H04B 7/2656 |
| | | | | 370/329 |
| 2015/0289207 | A1* | 10/2015 | Kubo | H04W 52/0219 |
| | | | | 370/311 |

OTHER PUBLICATIONS

International Search Report and Written Opinion from corresponding application No. PCT/SE2016/051152 dated Feb. 14, 2017, all enclosed pages cited.
Intent to grant from corresponding Swedish application No. 1551516-6 dated Mar. 30, 2017, all enclosed pages cited.
Search Report from corresponding Swedish application No. 1651312-9 dated Apr. 24, 2017, all enclosed pages cited.
Intent to grant from corresponding Swedish application No. 1651312-9 dated Apr. 25, 2018, all enclosed pages cited.

* cited by examiner

ABILITY TO INTERACT WITH PASSIVE BEACON RECEIVER DEVICES IN A SHORT-RANGE WIRELESS BEACON COMMUNICATION SYSTEM

TECHNICAL FIELD

The present invention generally relates to the field of beacon communication and short-range wireless beacon transmitter devices. More specifically, the invention relates to a short-range wireless beacon transmitter device, beacon communication system and associated method with improved ability to detect passive beacon receiver devices.

BACKGROUND

Short-range wireless beacon transmitter devices are used at various sites, such as shops, restaurants, cultural venues and sport arenas, to attract attention from nearby users of mobile communication devices such as mobile terminals like smartphones or tablets. The abbreviated notion mobile devices will be used herein when referring to such mobile communication devices.

For instance, the iBeacon technology from Apple allows for mobile devices to understand their location on a micro-local scale, and also allows delivery of hyper-contextual content to the users of mobile devices based on their current location. The iBeacon technology is based on the Bluetooth Low Energy (BLE) standard, and more particularly on Generic Access Profile (GAP) advertising packets. There are several other kinds of short-range wireless beacon technologies, for instance AltBeacon, URIBeacon and Eddystone, which are also based on BLE and GAP.

Figure 1A:
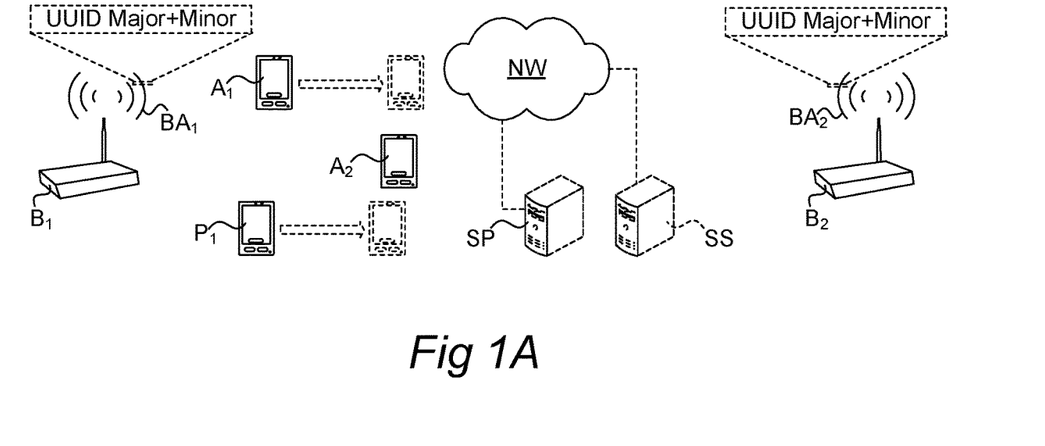
FIGS. 1A and 1B illustrate a basic short-range wireless beacon system having at least one static-location beacon transmitter device and a plurality of mobile devices acting as beacon receivers.

A basic short-range wireless beacon communication system is shown in FIG. 1A. A beacon transmitter device $B_1$ repeatedly broadcasts a short-range wireless beacon signal (also known as a beacon advertisement signal) $BA_1$ in a 31-byte GAP BLE packet. The beacon signal $BA_1$ contains a 128-bit universally unique identifier, UUID. The beacon signal $BA_1$ may also include a 16-bit major portion and a 16-bit minor portion. The beacon signal $BA_1$ identifies a beacon region associated with the beacon transmitter device $B_1$. Whereas, as is commonly known, a geographical region is an area defined by a circle of a specified radius around a known point on the Earth's surface, a beacon region is in contrast an area defined by a mobile device's proximity to one or more beacon transmitter devices.

In some implementations, the beacon region is represented by the UUID, the major portion and the minor portion in the beacon signal $BA_1$ In other implementations, the beacon region is represented by the UUID and the major or minor portion in the beacon signal $BA_1$. In still other implementations, the beacon region is represented by the UUID alone.

In FIG. 1A, a second beacon transmitter device $B_2$ also repeatedly broadcasts a short-range wireless beacon signal $BA_2$ for the same beacon region as the first beacon transmitter device $B_1$.

A conventional beacon transmitter device is typically static in the sense that it is permanently placed at a stationary location at a site for which beacon-triggered services are to be provided. Mobile devices nearby may receive the short-range wireless beacon signal $BA_1$ if they are within range of the beacon transmitter device $B_1$.

To this end, each mobile device is provided with an application program, app, which is configured to detect and react on short-range wireless beacon signals, such as beacon signal $BA_1$, with support from the underlying operating system. In one known beacon technology, the apps in mobile devices can detect and react on beacons in two ways, monitoring and ranging. Monitoring enables the app to detect movement in and out of the beacon region (i.e., whether the mobile device is within or outside of the range of any of the beacon transmitter devices with which the beacon region is associated). Hence, monitoring allows the app to scan for beacon regions. Ranging is more granular and provides a list of beacon transmitter devices in range, together with their respective received signal strength, which may be used to estimate a distance to each of them. Hence, ranging allows the app to detect and react on individual beacon transmitter devices in a beacon region.

These apps may be handled by the operating system of the mobile device in different modes. The most prominent mode is the active mode, in which the app executes in the foreground and is typically capable of interacting with the user of the mobile device and also to communicate with an external device such as a server via the short-range wireless beacon interface and/or another communication interface. As regards short-range wireless beacon communication, ranging only works when the app is in active mode.

In FIG. 1A, two mobile devices in the active mode are shown as $A_1$ and $A_2$. When, for instance, mobile device $A_1$ receives the beacon signal $BA_1$, the app in the mobile device $A_1$ may detect that it has entered the beacon region from the UUID (and the major/minor as the case may be) contained in the beacon signal $BA_1$, and react as appropriate in some way which is beneficial to the user and/or the host of the beacon transmitter device $B_1$ and which often involves interaction between the app in the mobile device $A_1$ and a service provider SP over a communication network NW. A system server SS may also be included in some implementations.

Examples of such beneficial use include, without limitation, determining a current approximate position of the mobile device $A_1$ by retrieving a predefined position of the beacon transmitter device $B_1$ from the service provider SP or by cross reference with local lookup data, or retrieving a content from the service provider SP.

A mobile device where the app is in active mode is referred to as an active mobile device in this document. An active mobile device $A_1$, $A_2$ may receive and react to additional transmissions of the beacon signal $BA_1$ from the beacon transmitter device $B_1$; this may be useful for instance if the content associated with the host of the beacon transmitter device $B_1$ is updated or changed.

Furthermore, an active mobile device may receive and react to beacon signals from other beacon transmitter devices nearby, such as beacon transmitter device $B_2$ in FIG. 1A, provided of course that they are within range of the respective beacon transmitter device (see mobile device $A_2$ with respect to beacon transmitter device $B_2$ in FIG. 1A), or move closer to it (mobile device $A_1$ and beacon transmitter device $B_2$). This is so irrespective of whether the different beacon transmitter devices $B_1$ and $B_2$ advertise the same beacon region (i.e. contain the same UUID and major/minor in the respective beacon signals $BA_1$ and $BA_2$, like in FIG. 1A), or different beacon regions (provided that the app is configured to monitor for such different beacon regions). It is to be noticed that the same beacon region (e.g. same UUID) is very often used for different beacon transmitter devices hosted by the same host, such as within the same supermarket, arena, fastfood restaurant, etc.

The operating system of the mobile devices may also handle apps in a passive mode. A purpose of the passive mode is power preservation, since the mobile devices are typically powered by batteries and since it is a general technical ambition to maximize the operational time of a mobile device between successive charging sessions. In the passive mode, the app executes in the background or is only installed on the mobile device. Unlike ranging which only works when the app is in active mode, monitoring works when the app is in active mode as well as when the app is in passive mode.

Transitions between active mode and passive mode may be based on user interaction, user preference settings in the app or the operating system, or program logic in the app or the operating system.

A mobile device where the app is in passive mode is referred to as a passive mobile device in this document. In the passive mode, the app typically cannot interact with the user via the user interface, nor communicate with a server or another device—except for the following. Just like active mobile devices, a nearby passive mobile device (such as $P_1$ in FIG. 1A) may monitor for a beacon region and hence receive a short-range wireless beacon signal (such as $BA_1$ or $BA_2$) if it is within range of the beacon transmitter device in question (e.g. $B_1$ or $B_2$). However, unlike active mobile devices, after a short beacon scanning period in the monitoring, during which the beacon transmitter device $B_1$ or $B_2$ is discoverable and also communication with a server or another device is possible, and unless it switches to active mode, the passive mobile device $P_1$ will not be able to react to additional beacon signals for the same beacon region from the beacon transmitter device $B_1$ or $B_2$.

Instead, after the short beacon scanning period (which typically lasts for some seconds, such as about 10 seconds), the passive mobile device $P_1$ will be "ignorant" or "deaf to", i.e. not react on, additional beacon signals for the same beacon region for as long as it stays in passive mode and continues to detect such beacon signals, for instance because it remains within range of the beacon transmitter device $B_1$ (or $B_2$) and continues to detect its beacon signal. Only once the passive mobile device $P_1$ has not received the beacon signal $BA_1$ or $BA_2$, or any other beacon communication which advertises the same beacon region, for a certain time, such as 1-15 minutes, the passive mobile device $P_1$ will again be reactive to the beacon signal $BA_1$ or $BA_2$, or any other beacon communication which advertises the same beacon region.

Figure 1B:
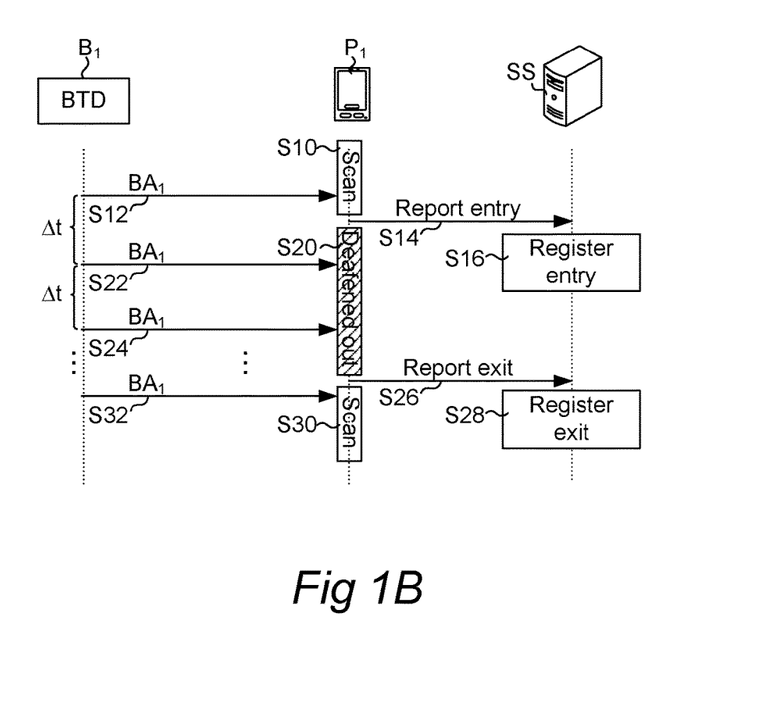

An example situation to illustrate the above is given as a schematic timeline diagram in FIG. 1B. The beacon transmitter device (BTD) $B_1$ transmits the beacon signal $BA_1$ at a certain periodicity, with a short time $\Delta t$ between each transmission of the beacon signal $BA_1$ at steps S12, S22, S24 and S32. The time $\Delta t$ between successive transmissions of the beacon signal $BA_1$ is typically in the order of 1 second. A beacon market analysis performed by the present applicant has found that the beacon transmission periodicity is at about 1 Hz or higher for a number of beacon transmitter devices from different manufacturers, which means that the time $\Delta t$ between successive transmissions of the beacon signal is 1 second or less.

During the short beacon scanning period S10 of the monitoring, the passive mobile device $P_1$ in FIG. 1B will therefore be able to detect and react on the first transmission S12 of the beacon signal $BA_1$. The reaction may, for instance, involve reporting to an external device such as a server SS that the beacon region identified by the beacon signal $BA_1$ has been entered, see steps S14 and S16. Following this, the passive mobile device $P_1$ will enter into a "deafened out" state S20 in which it will not be capable to react on the subsequent transmissions of the beacon signal $BA_1$, see steps S22, S24, . . . . The "deafened out" state S20 will last for a certain time, which in a typical prior art implementation is at least 30 seconds to avoid false positives due to effects in the radio signal environment (e.g. multi-propagation delay). The "deafened out" state S20 will often last substantially longer than 30 seconds, sometimes as long as about 15 minutes depending on operational factors such as, for instance, battery level, power consumption or operating system scheduling in the passive mobile device.

When the "deafened out" state S20 is ended, there will again be a short beacon scanning period S30 of the monitoring performed by the passive mobile device $P_1$. An exit event may be reported, as seen at S26, and processed by the receiving external device (e.g. the server SS) in step S28. During the beacon scanning period S30, the passive mobile device $P_1$ will again be capable of detecting and reacting on a subsequent transmission S32 of the beacon signal $BA_1$, but all of the intermediate transmissions S22, S24, . . . will have been ignored.

The present inventors have identified several problems associated with the above.

It is a problem for the host of the beacon transmitter device $B_1$, since it will prevent the host from advertising for new or updated content. It is also a problem to the passive mobile device $P_1$, since it will be deprived of an opportunity to react on the beacon signal $BA_1$ during the period when it is "deafened out".

This also means that when there are several beacon transmitter devices in the beacon region, a passive mobile device will be locked to the beacon transmitter device which it first discovered in the beacon region for as long as it stays within range of that beacon transmitter device's beacon signal. In the example of FIG. 1A, the passive mobile device $P_1$ has first discovered the first beacon transmitter device $B_1$ It then moves towards and enters into range of the second beacon transmitter device $B_2$ while remaining within range of the first beacon transmitter device $B_1$ Since the two beacon transmitter devices $B_1$ and $B_2$ broadcast their beacon signals $BA_1$ and $BA_2$ for the same beacon region (same UUID), the passive mobile device $P_1$ will not be able to discover the second beacon transmitter device $B_2$ and react to its beacon signal $BA_2$.

This is, again, problematic both from the point of view of the passive mobile device $P_1$ itself and for the host of the beacon transmitter devices, for the reasons explained above. In addition to this, the host of the beacon transmitter devices will not be able to track the movement of the passive mobile device $P_1$ and broadcast an adapted service offer to the user of the passive mobile device $P_1$ as a result of the movement (such as, for instance, offering a first content when the user is in a first subarea where the first beacon transmitter device $B_1$ is located and a different, second content when the user is in a second subarea where the second beacon transmitter device $B_2$ is located).

Moreover, when the mobile device app uses beacon-based localization functionality for the purpose of determining the location of the user with a high degree of accuracy by means of triangulation based on several stationary beacon transmitter devices covering the same beacon region, for instance indoors, there might be a problem if the mobile device is in passive mode. The passive mobile device $P_1$ will not be able to update its estimated location caused by the movement, since the second beacon transmitter device $B_2$ will not be detected when the passive mobile device $P_1$ is still within range of the first beacon transmitter device $B_1$.

In recent time, applications have been introduced which are based on mobile beacon transmitter devices rather than stationary. For instance, the present applicant has taken leadership in developing a new beacon-based technology which considerably facilitates for users of mobile devices which are proximate to each other to interact by, for instance, sharing content or conducting social media interaction.

The technology, which can be referred to as a "bubble" concept, is based on short-range wireless beacon broadcast messaging for establishing a dynamic, proximity-based network. Interaction between the users of the mobile devices in the network is supported by broadband communication with a server. Details are disclosed in the Swedish patent applications SE 1451203-2 "COMMUNICATION DEVICE FOR IMPROVED SHARING OF CONTENT", SE 1400535-9 "SELECTIVE USER INTERACTION IN A DYNAMIC, PROXIMITY-BASED GROUP OF WIRELESS COMMUNICATION DEVICES", SE 1451433-5 "DYNAMIC TIMING FOR IMPROVED COMMUNICATION HANDLING BETWEEN COMMUNICATION DEVICES", SE 1451509-2 "COMMUNICATION DEVICE FOR IMPROVED ESTABLISHING OF A CONNECTION BETWEEN DEVICES", SE 1550486-3 "TEMPORARY PROXIMITY BASED LICENSE FOR APPLICATION ACCESS" and SE 1551329-4 "IMPROVED ABILITY TO DETECT PASSIVE BEACON RECEIVER DEVICES IN A SHORT-RANGE WIRELESS BEACON COMMUNICATION SYSTEM", the contents of which are incorporated herein in their entirety.

Figure 1C:
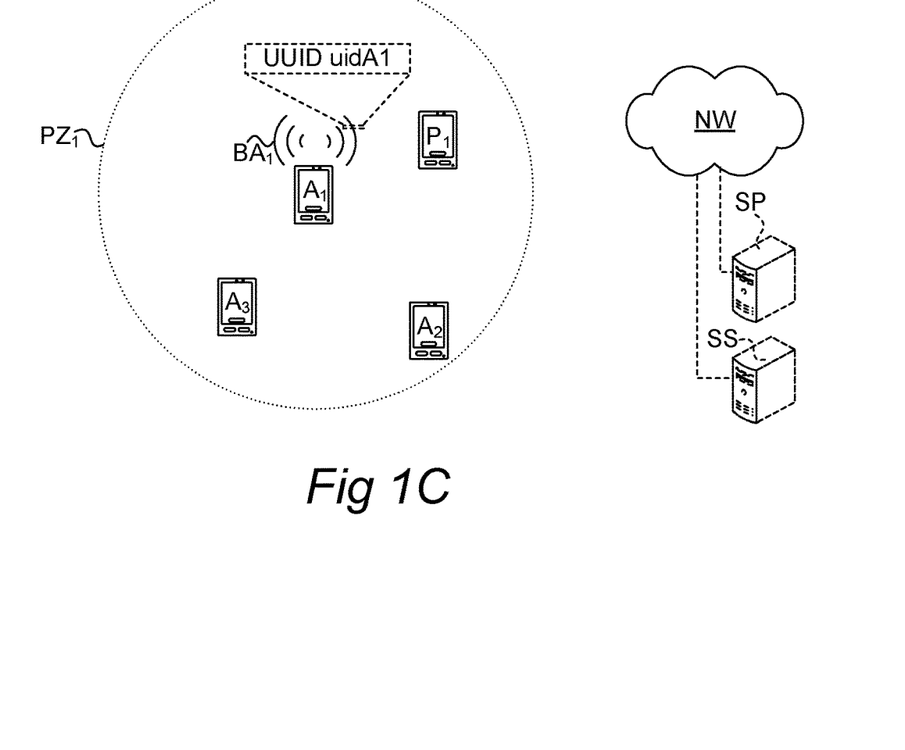
FIGS. 1C-1D illustrate an alternative short-range wireless beacon system having a plurality of mobile devices acting as beacon transmitters as well as beacon receivers.

A short-range wireless beacon system based on mobile beacon transmitter devices is shown in FIG. 1C. While it can generally be used for various different purposes, the system in FIG. 1C is advantageously used for implementing the abovementioned bubble concept. To this end, each mobile device $A_1$, $A_2$, $A_3$, $P_1$ is provided with an app which (together with the operating system and hardware in the mobile device) is configured to handle transmission as well as reception of short-range wireless beacon signals. Hence, unlike the basic static beacon system in FIG. 1A, in the bubble system of FIG. 1C, each mobile device can act as a beacon transmitting device as well as a beacon receiving device. In FIG. 1C, the mobile device $A_1$ is in active mode and repeatedly broadcasts its short-range wireless beacon signal $BA_1$, containing a 128-bit universally unique identifier UUID and a device identifier uidA1 within the 32-bit major/minor portion of the beacon signal.

Other active mobile devices $A_2$, $A_3$ within a proximity zone (range) $PZ_1$ of the mobile device $BA_1$ can receive the beacon signal $BA_j$, read the UUID and the uidA1, and as a result contact a system server SS over a communication network NW. The app in the receiving mobile device may decide, for instance based on user interaction, user preference settings and/or program logic in the app, to join the bubble of the mobile device $A_1$, wherein the system server SS will register the receiving mobile device as belonging to the bubble of the mobile device $A_1$. This is seen for the active mobile devices $A_2$ and $A_3$ in FIG. 1C. The users of the bubble members $A_1$-$A_3$ may then, for instance, share content or conduct social media interaction supported by a system server SS and/or a service provider SP over the communication network NW.

There may also be passive mobile devices within the proximity zone $PZ_1$ of the active mobile device $A_1$. This is seen for a passive mobile device $P_1$ in FIG. 1C. The passive mobile device $P_1$ will also receive the beacon signal $BA_1$ as identified by the UUID. However, if the mobile device $P_1$ remains in passive mode, it will not be able to react to additional transmissions of the beacon signal $BA_1$ from the active mobile device $A_1$ for the reasons explained above with respect to FIGS. 1A and 1B. The passive mobile device $P_1$ will therefore not be susceptive of additional tranmissions of the beacon signal $BA_1$ from the active mobile device $A_1$ during the "deafened out" state.

Figure 1D:
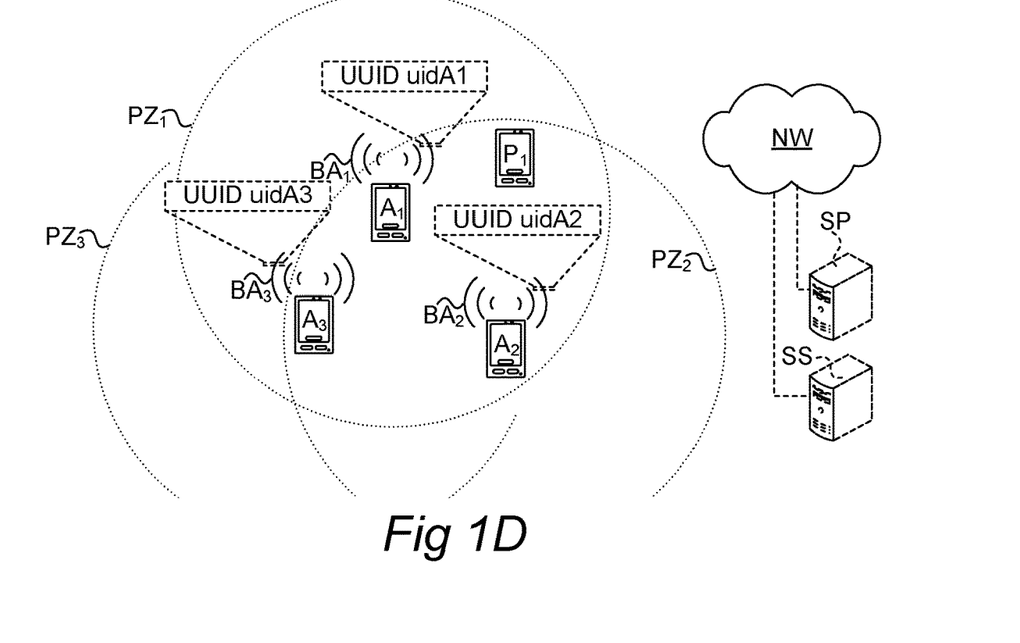

This problematic situation is complicated further by the fact that in a bubble system, all active mobile devices are potential senders as well as receivers of beacon signals. As seen in FIG. 1D, the other active mobile devices $A_2$ and $A_3$ may also send respective beacon signal $BA_2$ and $BA_3$ to generate a respective bubble of nearby mobile devices within their respective proximity zones $PZ_2$ and $PZ_3$. These transmissions typically use the same common UUID, wherein the transmissions are individualized by including a respective device identifier uidA2 and uidA3 within the 32-bit major/minor portion of the respective beacon signal $BA_2$ and $BA_3$.

While the active mobile devices $A_1$ and $A_3$ may react to the beacon signal $BA_2$ and hence join the bubble of the active mobile devices $A_2$ (and correspondingly for the active mobile devices $A_1$ and $A_2$ with respect to the active mobile device $A_3$), this is not so for the passive mobile device $P_1$ since it has already detected the beacon signal $BA_1$ of the first active mobile device $A_1$ and thus been deafened out.

A problem from the point of view of the passive mobile device $P_1$ is that it will not have any opportunity to hear the beacon signals $BA_2$ or $BA_3$ as identified by the common UUID and as a result not be given any opportunity to join other bubbles than the bubble of the first active mobile device $A_1$. A problem from the point of view of the active mobile devices $A_2$ and $A_3$ is correspondingly that they will not be aware of the presence of the passive mobile device $P_1$ within their proximity zones $PZ_2$ and $PZ_3$, nor announce their availability as bubble creators to the passive mobile device $P_1$.

As is clear from the above description, the present inventor has identified several problems with beacon systems of the prior art. The inventive aspects which will be described in the following sections of this document are generally (but not necessarily) believed to be applicable to stationary as well as mobile beacon transmitter devices.

SUMMARY

It is accordingly an object of the invention to offer improvements in the technical field of short-range wireless beacon communication systems, and to solve, eliminate, alleviate, mitigate or reduce at least some of the problems referred to above.

A first aspect of the present invention is a beacon transmitter device comprising a controller and a short-range wireless beacon transmitter. The controller is configured to cause a first transmission of a short-range wireless beacon signal by the beacon transmitter, the beacon signal identifying a beacon region, then wait during a beacon delay time period, and then cause a second transmission of the short-range wireless beacon signal by the beacon transmitter. The beacon delay time period is sufficiently long to allow a short-range wireless beacon receiver device, when being in a passive mode, being in range of the beacon region and having received the first transmission of the beacon signal, to receive and react on the second transmission of the beacon signal.

Hence, a beacon transmitter device with improved ability to interact with passive beacon receiver devices has been provided.

Another aspect of the present invention is a method of beacon transmitter device. The method involves causing a first transmission of a short-range wireless beacon signal, the beacon signal identifying a beacon region. The method also involves waiting during a beacon delay time period which is sufficiently long to allow a short-range wireless beacon receiver device, when being in a passive mode, being in range of the beacon region and having received the first transmission of the beacon signal, to receive and react on a second transmission of the beacon signal. After expiry of the beacon delay time period, the method involves causing the second transmission of the short-range wireless beacon signal.

Accordingly, a method of operating a beacon communication system with improved ability to interact with passive beacon receiver devices has been provided.

Still another aspect of the present invention is a beacon communication system comprising a plurality of beacon transmitter devices according to the first aspect of the present invention, wherein the first transmission of the short-range wireless beacon signal, the waiting during the beacon delay time period, and the second transmission of the short-range wireless beacon signal occur essentially concurrently at the respective beacon transmitter devices.

As a result, a beacon communication system with improved ability to interact with passive beacon receiver devices has been provided.

Other aspects, objectives, features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein.

All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 2A:
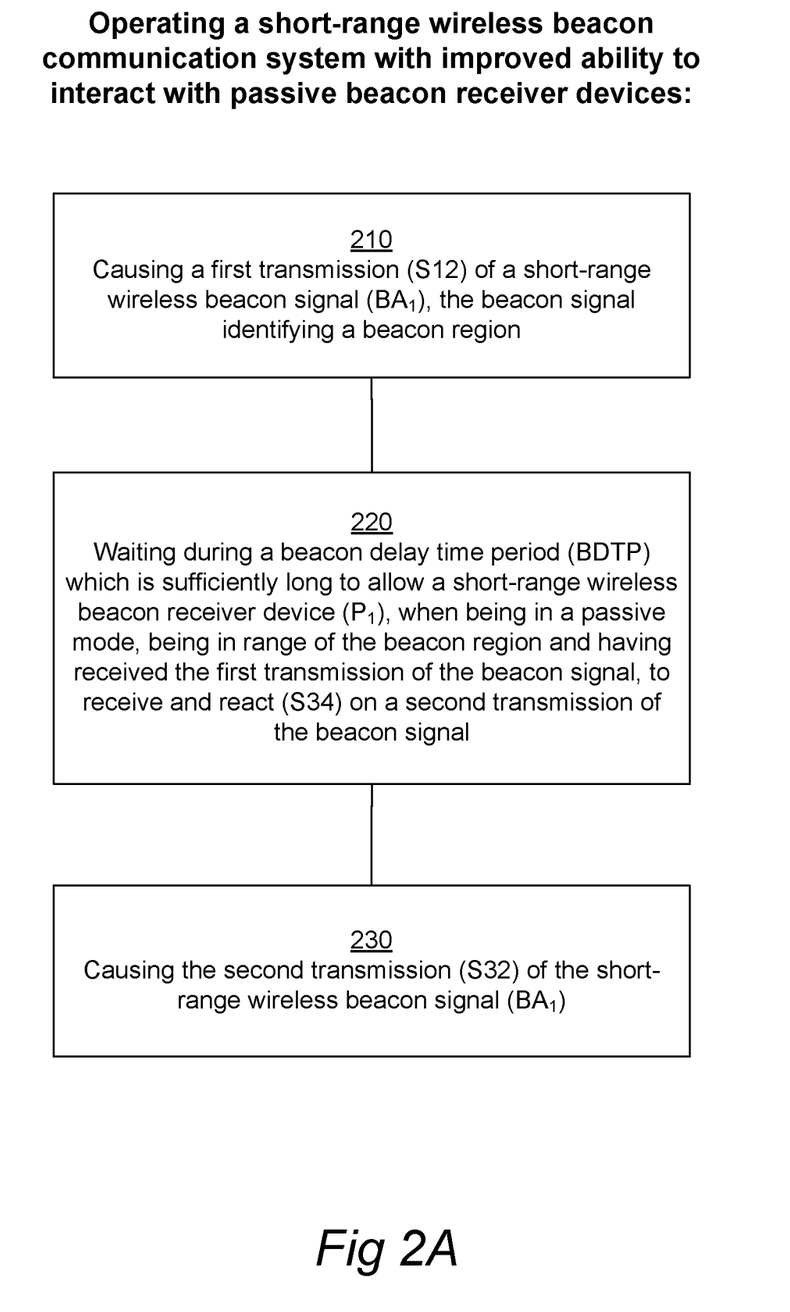
FIGS. 2A-B illustrate a general method according to the invention of operating a short-range wireless beacon communication system with improved ability to interact with passive beacon receiver devices, and an associated schematic timeline diagram.
Figure 2B:
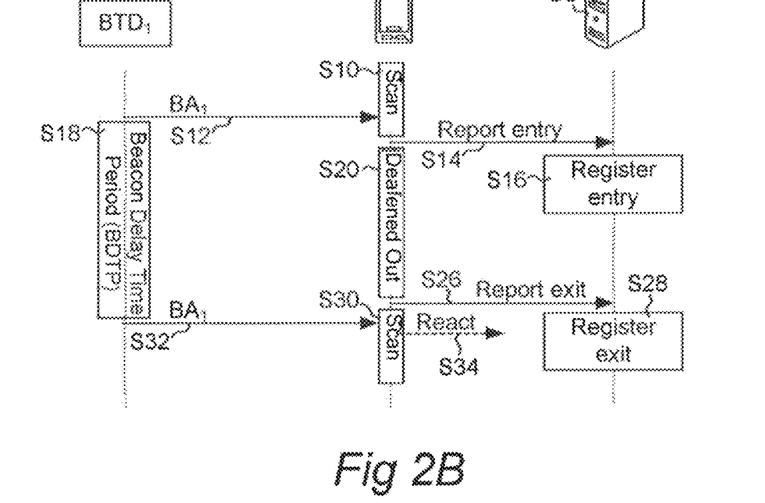

FIG. 2A illustrates a general method according to the invention of operating a short-range wireless beacon transmitter device $BTD_1$ with improved ability to interact with passive beacon receiver devices. FIG. 2B is a schematic timeline diagram for an embodiment of the method in FIG. 2A. Elements in FIG. 2B which contain the same reference numerals Snn as in FIG. 1B have essentially the same function as already described in the Background section for FIG. 1B, and the description of them is not repeated.

The beacon transmitter device $BTD_1$ may be a stationary beacon transmitter device generally of the kind shown in FIGS. 1A-B, or a mobile beacon transmitter device generally of the kind shown in FIGS. 1C-D, however improved in an inventive way which will now be explained. Exemplary implementations of the beacon transmitter device $BTD_1$ are described later in this document with reference to FIGS. 7 and 9.

Figure 7:
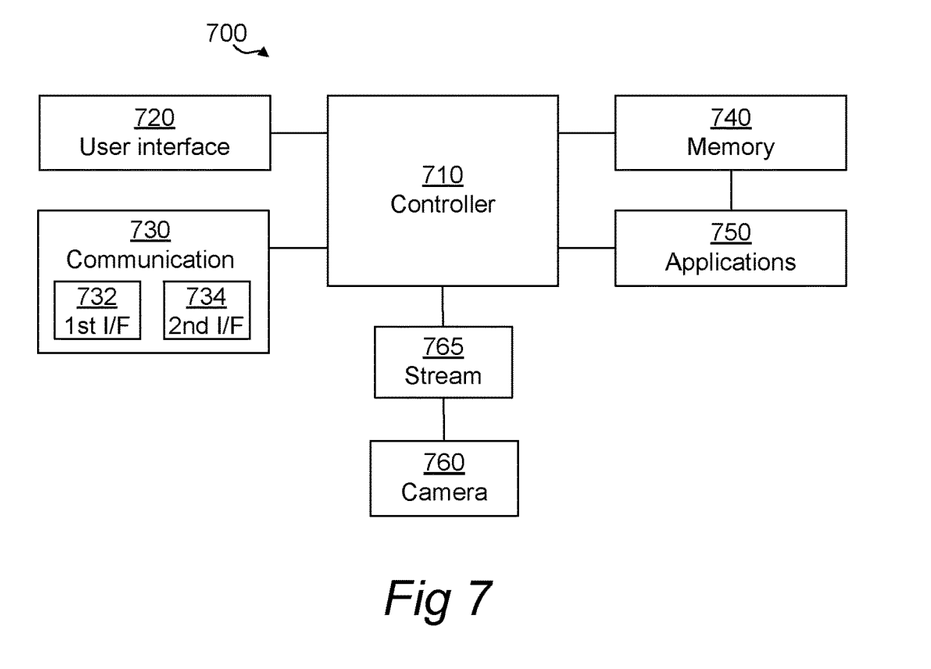
FIG. 7 is a schematic view of components of the mobile communication device in FIG. 6A or 6B.
Figure 9:
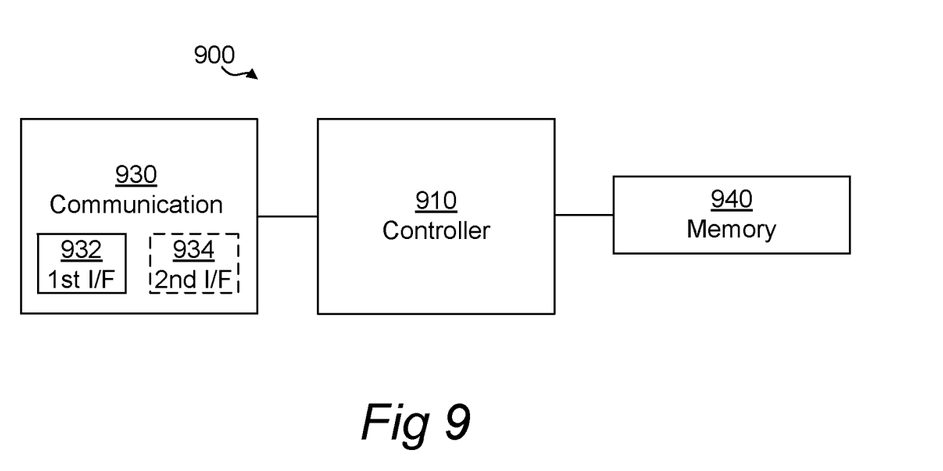
FIG. 9 is a schematic view of components of a beacon transmitter device.

In a first step 210 in FIG. 2A, the beacon transmitter device $BTD_1$ makes a first transmission of a short-range wireless beacon signal $BA_1$. This is seen at step S12 in FIG. 2B. The beacon signal $BA_1$ identifies a beacon region, as has been described in the Background section of this document. The transmission of the short-range wireless beacon signal $BA_1$ may preferably made by a short-range wireless beacon transmitter of the beacon transmitter device $BTD_1$, the transmitter being implemented, for instance, by a first communication interface 732 of a wireless communication means 730 as seen in FIG. 7, or being implemented, for instance, by a first communication interface 932 of a wireless communication means 930 as seen in FIG. 9. The transmission of the short-range wireless beacon signal $BA_1$ may be caused by a controller of the beacon transmitter device $BTD_1$, the controller being implemented, for instance, by a controller 710 as seen in FIG. 7, or being implemented, for instance, by a controller 910 as seen in FIG. 9.

In a second step 220 in FIG. 2A, (the controller of) the beacon transmitter device $BTD_1$ waits during a beacon delay time period BDTP. This is seen at S18 in FIG. 2B. The beacon delay time period BDTP is sufficiently long to allow a short-range wireless beacon receiver device $P_1$, when being in a passive mode, being in range of the beacon region and having received the first transmission of the beacon signal, to receive and react (see S34 in FIG. 2B) on a second transmission of the beacon signal $BA_1$. The short-range wireless beacon receiver device $P_1$ is typically a passive mobile device generally of the kind shown in and described above for FIGS. 1A-D.

Hence, the beacon transmitter device $BTD_1$ makes no further transmissions of the beacon signal $BA_1$ during the beacon delay time period BDTP, which is selected, chosen, designed or otherwise defined to last at least as long as the "deafened out" state S20 of the passive mobile device $P_1$. This is in contrast to the frequent subsequent transmissions of the beacon signal at steps S22, S24, . . . , in the prior art according to FIG. 1B.

Then, after the waiting step 220, in a third step 230 in FIG. 2A, the beacon transmitter device $BTD_1$ makes a subsequent second transmission of the short-range wireless beacon signal $BA_1$, see step S32 in FIG. 2B. Again, the transmission may be caused by the aforementioned controller.

Thanks to the waiting in step 220/S18 during the beacon delay time period BDTP, the subsequent second transmission of the beacon signal $BA_1$ will—as seen at S32 in FIG. 2B—occur when the "deafened out" state S20 of the passive mobile device $P_1$ has ended and a new beacon scanning period S30 of the monitoring has commenced. This will allow the short-range wireless beacon receiver device $P_1$ to receive and react (step S34) on the second transmission of the beacon signal $BA_1$, for instance in the same way or a way similar to how it reacted on the first transmission of the beacon signal $BA_1$.

As will be understood from the above, the beacon delay time period BDTP is advantageously defined to be at least equal to an expected duration it would take for the short-range wireless beacon receiver device $P_1$, after having received a first transmission of the beacon signal $BA_1$, to become capable of receiving and reacting on a subsequent second transmission of the beacon signal $BA_1$.

Figure 3A:
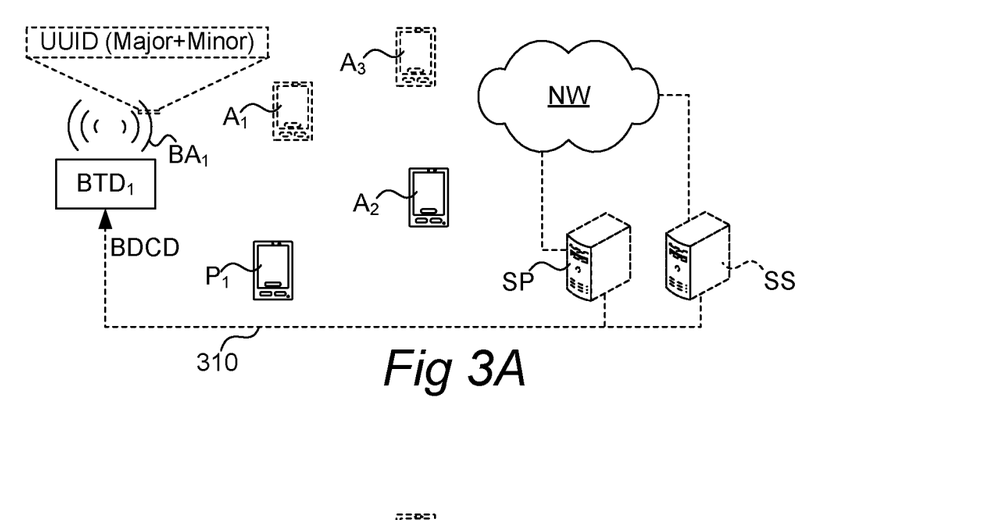
FIGS. 3A-3C are illustrations of a chain of events occurring in a beacon system comprising a beacon transmitter device generally designed according to an embodiment of the system in FIG. 1A when being subjected to the operating method of FIG. 2A.
Figure 3B:
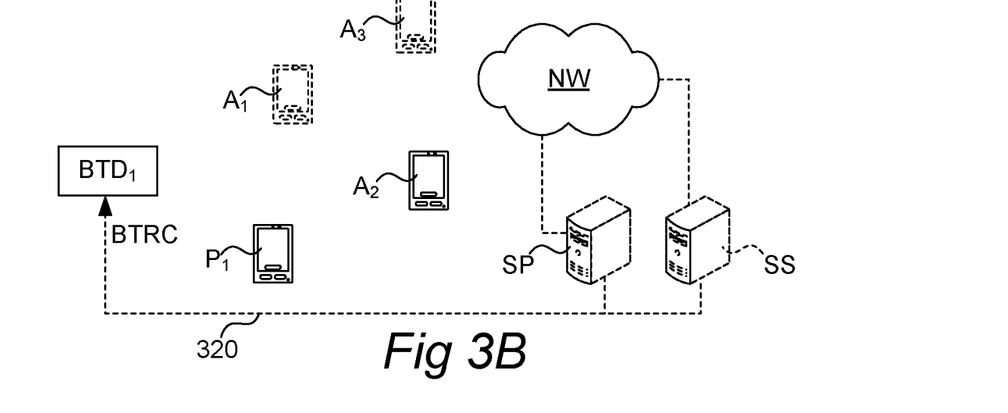

FIGS. 3A-3C illustrate what happens to the beacon system as seen in FIG. 1A (the beacon transmitter device $BTD_1$ being the stationary beacon transmitter device $B_1$) or FIG. 1C (the beacon transmitter device $BTD_1$ being the mobile device $A_1$) when subjected to the operating method of FIG. 2A. The situation in step 210 is represented by FIG. 3A; the beacon transmitter device $BTD_1$ makes the first transmission of the short-range wireless beacon signal $BA_1$. Active mobile device $A_1$, $A_2$, $A_3$ and passive mobile device $P_1$ may receive and react upon the beacon signal $BA_1$, and passive mobile device $P_1$ will then be "deafened out" for some time as previously discussed. The situation in step 220 is represented by FIG. 3B. Here, the beacon transmitter device $BTD_1$ suspends transmission of the short-range wireless beacon signal during the beacon delay time period BDTP.

Figure 3C:
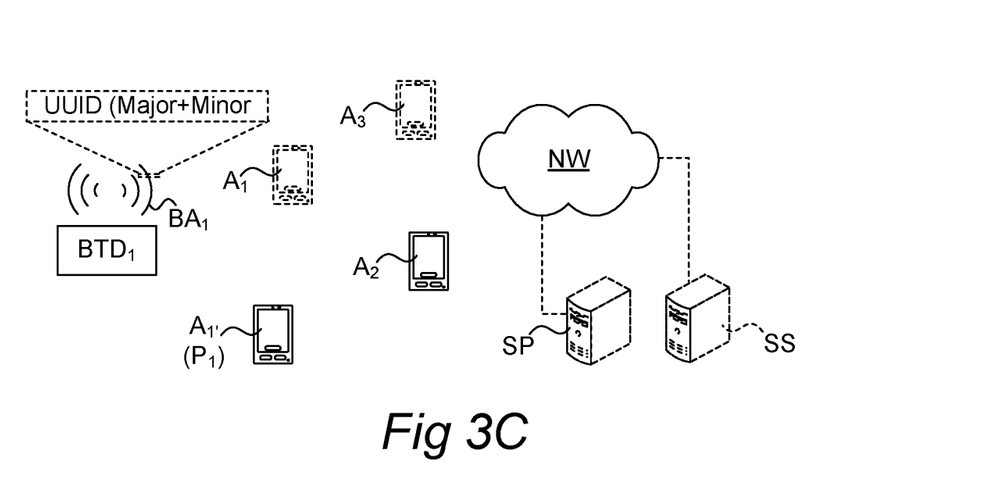

The situation in step 230 is represented by FIG. 3C where the beacon transmitter device $BTD_1$ resumes transmission of the short-range wireless beacon signal. Thanks to the waiting during the beacon delay time period BDTP, the subsequent second transmission of the beacon signal $BA_1$ in FIG. 3C is likely to occur when the passive mobile device $P_1$ is no longer deafened out.

In one embodiment, the (controller of the) beacon transmitter device $BTD_1$ is configured to operate on a periodic basis, such that after the transmission of the second transmission of the beacon signal $BA_1$, the controller will wait during the beacon delay time period BDTP and then cause a third transmission of the short-range wireless beacon signal $BA_1$ by the beacon transmitter, and so on.

The duration of the beacon delay time period BDTP may be configurable. In one embodiment, this may be done by the (controller of the) beacon transmitter device $BTD_1$ receiving beacon delay control data BDCD from an external device (such as a service provider SP or a system server SS) via a communication interface. See 310 in FIG. 3A. The communication interface may, for instance, be implemented by a second communication interface 734 of the wireless communication means 730 as seen in FIG. 7, or by a second communication interface 934 of the wireless communication means 930 as seen in FIG. 9.

The (controller of the) beacon transmitter device $BTD_1$ will derive a timer value from the received beacon delay control data, and set the duration of the beacon delay time period BDTP to the derived timer value.

In an alternative embodiment, the duration of the beacon delay time period BDTP is not fixed a priori. Instead, the end of the beacon delay time period BDTP may be controlled from an external device (such as the service provider SP or the system server SS) via the aforementioned communication interface. See 320 in FIG. 3B. The (controller of the) beacon transmitter device $BTD_1$ will receive a beacon transmission resumption command BTRC from the external device. In response, the (controller of the) beacon transmitter device $BTD_1$ will terminate the beacon delay time period BDTP and cause the second transmission of the short-range wireless beacon signal $BA_1$ by the beacon transmitter.

In yet an alternative embodiment, the duration of the beacon delay time period BDTP is not fixed a priori. Instead, the end of the beacon delay time period BDTP may be controlled by the beacon transmitter device $BTD_1$ by enquiring an external device (such as the service provider SP or the system server SS) via the aforementioned communication interface. This is illustrated in FIG. 4 which can be seen as an extension of FIG. 2B (again, the same reference numerals represent essentially the same elements/functionality).

Figure 4:
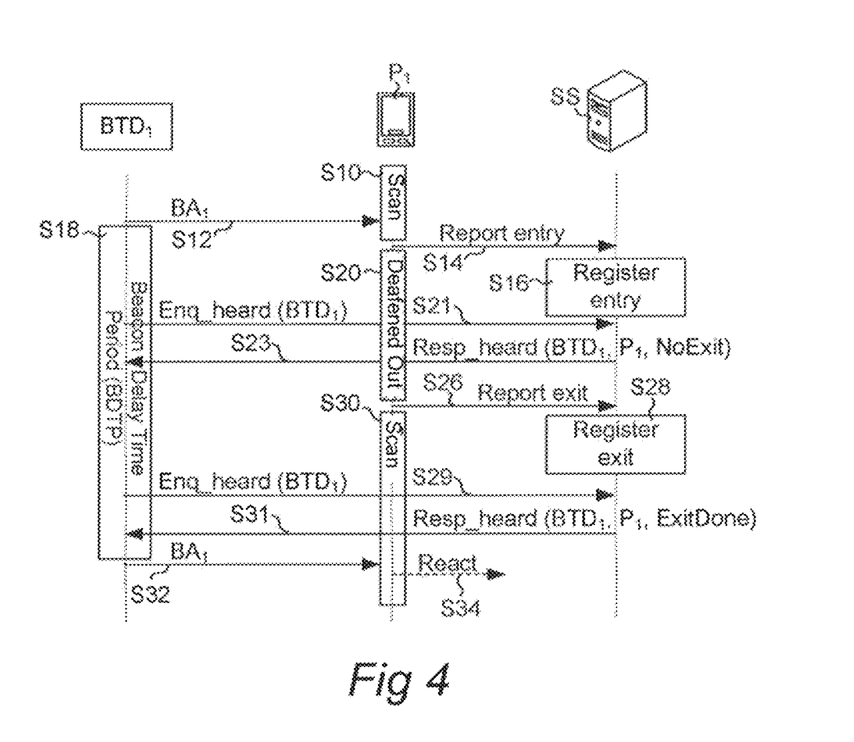
FIG. 4 is a schematic timeline diagram which illustrates an embodiment which can be seen as an extension of FIG. 2B.

In FIG. 4, the (controller of the) beacon transmitter device $BTD_1$ sends in step S21 an inquiry Enq_heard ($BTD_1$) to the external device SS, SP via the communication interface. The inquiry is sent during the beacon delay time period BDTP.

In response, the (controller of the) beacon transmitter device $BTD_1$ receives in step S23 a response Resp_heard from the external device SS, SP via the communication interface.

The (controller of the) beacon transmitter device $BTD_1$ then determines whether the received response indicates presence of at least one short-range wireless beacon receiver device, being in the passive mode, having received the first transmission S12 of the beacon signal $BA_1$, having reported S14 an entry event for the beacon region as identified by the beacon signal $BA_1$ to the external device SS, SP but not having reported an exit event for the beacon region to the external device.

If the determination is affirmative, the (controller of the) beacon transmitter device $BTD_1$ continues the beacon delay time period BDTP. This is seen for the received inquiry response Resp_heard ($BTD_1$, $P_1$, NoExit) in step S23 of FIG. 4. The beacon transmitter device $BTD_1$ is hence informed that there is indeed a passive mobile device $P_1$ which has reported an entry event but not an exit event for the monitored beacon region. The beacon transmitter device $BTD_1$ may thus conclude that the passive mobile device $P_1$ is probably deafened out and that the beacon delay time period BDTP should continue.

The passive mobile device $P_1$ then reports an exit event to the external device SS, SP in step S26, and the external device SS, SP registers this in step S28, as previously described.

The (controller of the) beacon transmitter device $BTD_1$ then sends in step S29 another inquiry Enq_heard ($BTD_1$) to the external device SS, SP via the communication interface. The inquiry is still sent during the beacon delay time period BDTP.

In response, the (controller of the) beacon transmitter device $BTD_1$ receives in step S31 a response Resp_heard from the external device SS, SP via the communication interface.

The (controller of the) beacon transmitter device $BTD_1$ then determines whether the received response indicates presence of at least one short-range wireless beacon receiver device, being in the passive mode, having received the first transmission S12 of the beacon signal $BA_1$, and having reported an entry event S14 as well as an exit event S26 for the beacon region as identified by the beacon signal $BA_1$ to the external device SS, SP.

If the determination is affirmative, the (controller of the) beacon transmitter device $BTD_1$ terminates the beacon delay time period BDTP, and causes the second transmission S32 of the short-range wireless beacon signal $BA_1$ by the beacon transmitter 732; 932. This is seen for the received inquiry response Resp_heard ($BTD_1$, $P_1$, ExitDone) in step S31 of FIG. 4. The beacon transmitter device $BTD_1$ is hence informed that there is indeed a passive mobile device $P_1$ which has reported an entry event as well as an exit event for the monitored beacon region. The beacon transmitter device $BTD_1$ may thus conclude that the passive mobile device $P_1$ is not deafened out anymore and that the beacon delay time period BDTP should be terminated.

Figure 5A:
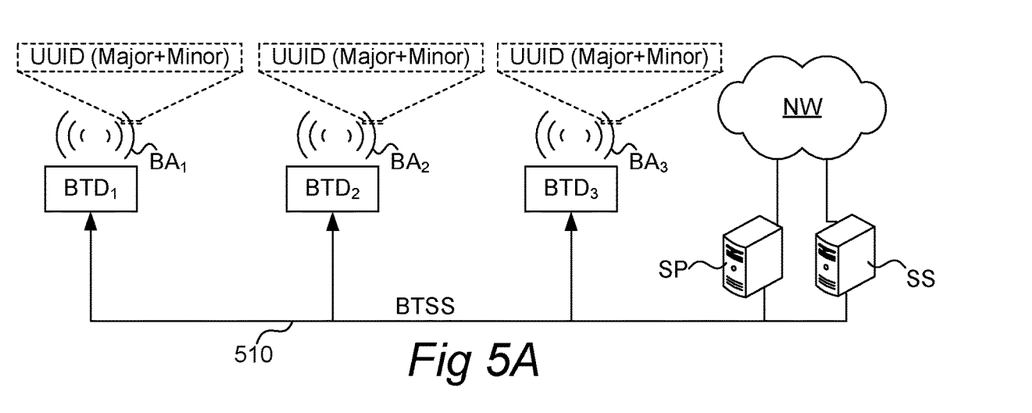
FIGS. 5A-5C are illustrations of a chain of events occurring in a beacon communication system comprising a plurality of beacon transmitter devices.
Figure 5B:
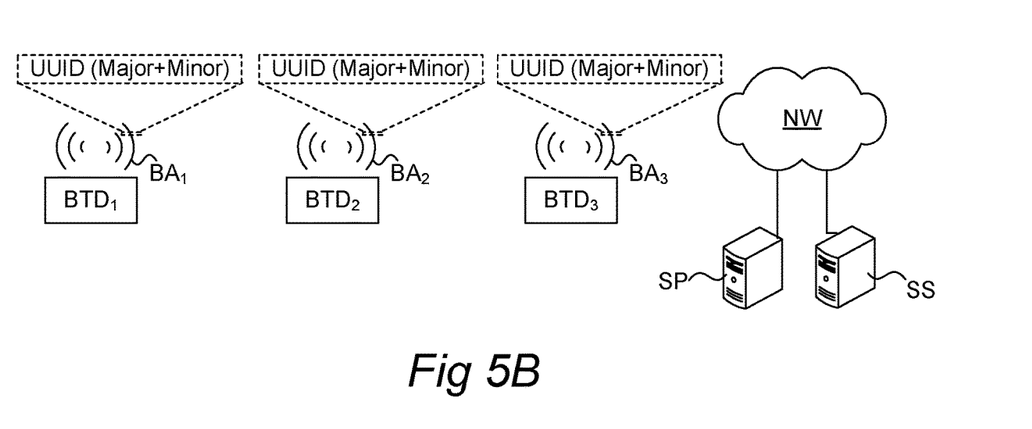
Figure 5C:
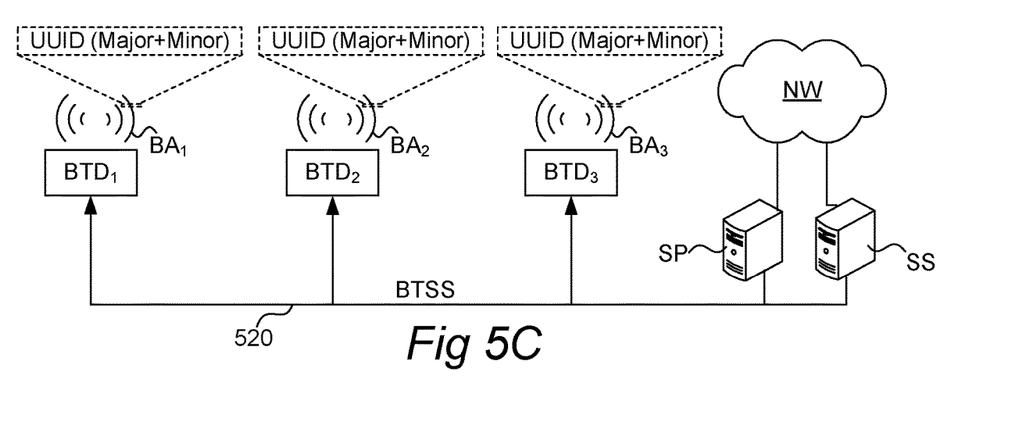

A beacon communication system may comprise a plurality of beacon transmitter devices, each essentially operating as has been described above. FIGS. 5A-C illustrates one embodiment of such a beacon communication system, comprising three beacon transmitter devices $BTD_1$, $BTD_2$, $BTD_3$ (the number of beacon transmitter devices in a beacon communication system may of course be less than or more than three depending on implementation). The beacon transmitter devices $BTD_1$, $BTD_2$, $BTD_3$ are operative to transmit short-range wireless beacon signals $BA_1$, $BA_2$ and $BA_3$. The first transmission 210 of the respective short-range wireless beacon signal $BA_1$, $BA_2$ or $BA_3$, the waiting 220 during the beacon delay time period BDTP, and the second transmission 230 of the respective short-range wireless beacon signal $BA_1$, $BA_2$ or $BA_3$ occur essentially concurrently at the beacon transmitter devices $BA_1$, $BA_2$ and $BA_3$.

This is beneficial, since it will reduce the risk that a passive mobile device in range of the beacon region (but not shown in FIGS. 5A-C for reasons of brevity) would be deafened out to an extent where it could not be reached for a long time after it detected the first transmission 210 of one of the short-range wireless beacon signals, because the first transmissions 210 of the other short-range wireless beacon signals would in effect prolong the deafened out period (if the passive mobile device stays within the beacon region).

To this end, in one embodiment an external device such as a server SS, SP is configured to periodically send a beacon transmission synchronization signal BTSS to the beacon transmitter devices $BTD_1$, $BTD_2$, $BTD_3$. More specifically, the aforementioned controller 710, 910 of each beacon transmitter device $BTD_1$, $BTD_2$, $BTD_3$ is configured to receive a first beacon transmission synchronization signal BTSS from the external device SS, SP via the aforementioned communication interface. This is seen at 510 in FIG. 5A. In response, the controller of each beacon transmitter device $BTD_1$, $BTD_2$, $BTD_3$ is configured to cause the aforementioned first transmission 210 of the short-range wireless beacon signal $BA_1$, $BA_2$ or $BA_3$ by the beacon transmitter 732; 932.

The beacon transmitter devices $BTD_1$, $BTD_2$, $BTD_3$ will then wait 220 during a beacon delay time period BDTP in which no beacon signals $BA_1$, $BA_2$ or $BA_3$ are sent. This is seen in FIG. 5B.

The end of the beacon delay time period BDTP will not need to be defined a priori. Instead, the controller of each beacon transmitter device $BTD_1$, $BTD_2$, $BTD_3$ is configured to receive a second beacon transmission synchronization signal BTSS from the external device SS, SP via the communication interface, and in response cause the second transmission 230 of the short-range wireless beacon signal by the beacon transmitter 732; 932 as seen in FIG. 5C—thereby in effect ending the beacon delay time period BDTP.

In one embodiment, the beacon transmission synchronization signal BTSS can implement the beacon transmission resumption command BTRC which has been described above for FIG. 3B.

As an alternative to external synchronization, the beacon transmitter devices $BTD_1$, $BTD_2$, $BTD_3$ can themselves keep track of the duration of the beacon delay time period BDTP by using a current time value. In such an embodiment, the controller 710, 910 of each beacon transmitter device $BTD_1$, $BTD_2$, $BTD_3$ may be configured to obtain a current time value from either a local clock provided in the beacon transmitter device or an external time keeping service accessible via the communication interface. If local clocks are used, they should be synchronized by some available means, such as a common time reference accessible via the communication interface.

The controller 710, 910 of each beacon transmitter device $BTD_1$, $BTD_2$, $BTD_3$ may further be configured to determine whether the obtained time value indicates that at least a time corresponding to the beacon delay time period BDTP has elapsed since the first transmission 210 of the short-range wireless beacon signal $BA_1$-$BA_3$ by the beacon transmitter 732, 932. If the determination is affirmative, the controller will cause the second transmission 230 of the short-range wireless beacon signal by the beacon transmitter.

One exemplary but beneficial use of a synchronized beacon communication system according to the invention is to track the movement of mobile devices (including passive mobile devices) as they are carried around in a shop, mall, sports arena, etc. Every time the first or second transmission of the beacon signals $BA_1$-$BA_3$ occurs from a beacon transmitter device $BTD_1$, $BTD_2$, $BTD_3$ in the beacon region, the mobile devices may report this to an external device such as the server SS, SP. By using information obtained by beacon ranging, the external device may then determine a current relative location of each mobile device in the shop, mall, sports arena, etc. (for instance by triangulation), and in response take appropriate action. Such action may for instance involve offering the individual mobile device a customized content depending on the current relative location of the mobile device, its movement behavior, etc.

Figure 6A:
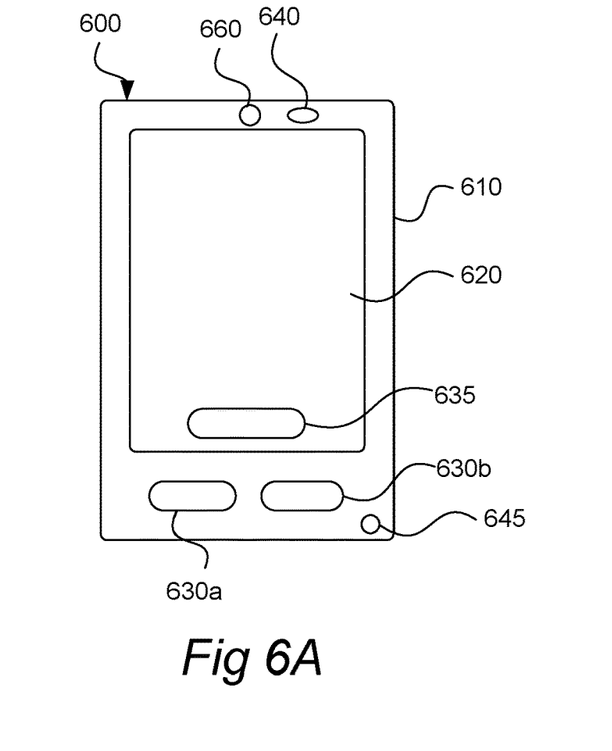
FIGS. 6A and 6B are schematic views of a mobile communication device according to two respective embodiments.
Figure 6B:
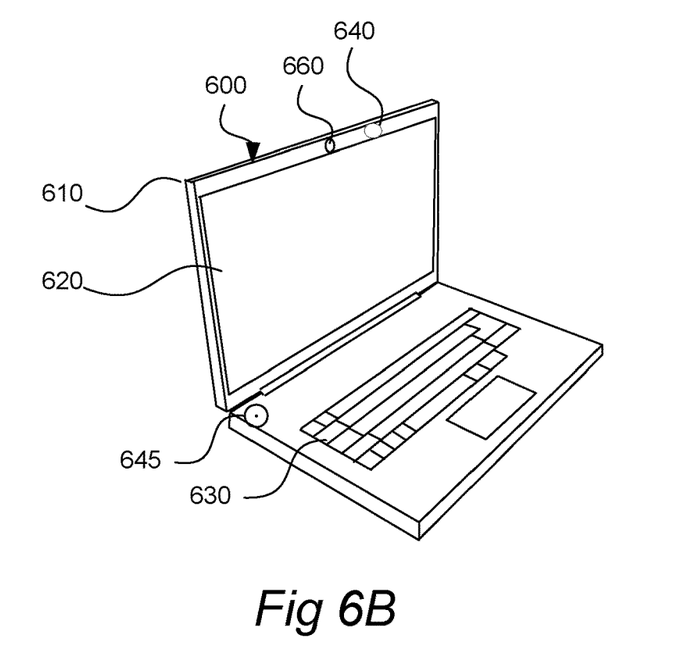

FIGS. 6A and 6B generally show a mobile, or wireless, communication device 600 which may implement any of the mobile devices $A_1$-$A_3$, $P_1$ referred to above. Referring to FIG. 6A, the wireless communication device is a mobile telecommunications terminal in the form of a smartphone or a tablet computer (arranged with a wireless communication interface), comprising a housing 610 in which a display 620 is arranged. In one embodiment the display 620 is a touch display. In other embodiments the display 620 is a non-touch display. Furthermore, the smartphone 600 comprises two keys 630a, 630b. In this embodiment there are two keys 630, but any number of keys is possible and depends on the design of the smartphone 600.

In one embodiment the smartphone 600 is configured to display and operate a virtual key 635 on the touch display 620. It should be noted that the number of virtual keys 635 depends on the design of the smartphone 600 and an application that is executed on the smartphone 600. The smartphone 600 may also be equipped with a camera 660. The camera 660 may be a digital camera that is arranged to take video or still photographs by recording images on an electronic image sensor (not shown). In one embodiment the camera 660 may be an external camera. In one embodiment the camera may alternatively be replaced by a source providing an image stream. The smartphone 600 may also be equipped with a loudspeaker 640 and a microphone 645.

Referring to FIG. 6B, a laptop computer 600 comprises a display 620 and a housing 610. The housing comprises a controller or CPU (not shown) and one or more computer-readable storage media (not shown), such as storage units and internal memory. Examples of storage units are disk drives or hard drives. The laptop computer 600 further comprises at least one data port. Data ports can be wired and/or wireless. Examples of data ports are USB (Universal Serial Bus) ports, Ethernet ports or WiFi (according to IEEE standard 802.11) ports. Data ports are configured to enable the laptop computer 600 to connect with other computing devices or a server.

The laptop computer 600 further comprises at least one input unit such as a keyboard 630. Other examples of input units are computer mice, touch pads, touch screens or joysticks, to name a few.

The laptop computer 600 may further be equipped with a camera 660. The camera 660 may be a digital camera that is arranged to take video or still photographs by recording images on an electronic image sensor (not shown). In one embodiment the camera 660 may be an external camera. In one embodiment the camera may alternatively be replaced by a source providing an image stream. The laptop computer 600 may also be equipped with a loudspeaker 640 and a microphone 645. The wireless communication device 600 according to FIG. 6A or FIG. 6B may be configured to detect and track an object, for instance a hand of a user, via the camera 660.

FIG. 7 shows a schematic view of the general structure of a communication device according to FIG. 6A or FIG. 6B. The device 700 comprises a controller 710 which is responsible for the overall operation of the wireless communication device 700 and is preferably implemented by any commercially available CPU ("Central Processing Unit"), DSP ("Digital Signal Processor") or any other electronic programmable logic device. The controller 710 is configured to read instructions from a memory 740 and execute these instructions to control the operation of the wireless communication device 200. The memory 740 may be implemented using any commonly known technology for computer-readable memories such as ROM, RAM, SRAM, DRAM, CMOS, FLASH, DDR, SDRAM or some other memory technology. The memory 740 is used for various purposes by the controller 710, one of them being for storing application data and program instructions 750 for various software modules in the wireless communication device 700. The software modules may include a real-time operating system, drivers for a user interface 720, an application handler as well as various applications 750.

The wireless communication device 700 further comprises the user interface 720, which in the devices 700 of FIGS. 6A and 6B is comprised of the display 620 and the keys 630, 635. The user interface may also comprise the microphone 645 and the loudspeaker 644.

The wireless communication device 700 further comprises wireless communication means 730, which is adapted to allow the wireless communication device 700 to communicate with other devices through the use of different radio frequency technologies. More specifically, the wireless communication means 730 comprises a first communication interface 732 for short-range wireless beacon broadcast messaging. The first communication interface 732 may implement the short-range wireless beacon transmitter as referred to previously in this document and may, advantageously, be implemented as an iBeacon and/or Bluetooth Low Energy (BLE)/Bluetooth 4.0 compliant communication interface.

Moreover, the wireless communication means 730 comprises a second communication interface 734 for communicating with a server like the system server SS and/or the service provider SP via the communication network NW. The communication with the server typically occurs at a substantially higher bandwidth than the short-range wireless beacon broadcast messaging. The server may be a stand-alone computing resource external to the wireless communication device 700, a cloud-based (distributed) computing resource, or, in alternative embodiments, implemented at least partly in and by the wireless communication device 700. The second communication interface 734 may, advantageously, be implemented as a communication interface compliant with IEEE 802.11, IEEE 802.15, ZigBee, WirelessHART, WiFi, Bluetooth®, WCDMA, HSPA, GSM, UTRAN, UMTS, and LTE, to name a few. It should be noted that, as is commonly known, the wireless communication means 730 may be arranged to communicate according to more than one technology and many different combinations may therefore be available; for example, a smartphone is commonly arranged to communicate according to the Bluetooth® standard, the WiFi standard and the LTE standard.

The wireless communication device 700 is further equipped with a camera 760. The camera 760 is a digital camera that is arranged to take video or still photographs by recording images on an electronic image sensor (not shown). The camera 760 is operably connected to the controller 710 to provide the controller with a video stream 765, i.e. the series of images captured, for further processing possibly for use in and/or according to one or several of the applications 750. In one embodiment the camera 760 is an external camera or source of an image stream.

FIG. 9 shows a schematic view of the general structure of a communication device 900 which may implement any of the beacon transmitter devices $B_1$ or $B_1$ as described herein. The device 900 comprises a controller 910 which is responsible for the overall operation of the wireless communication device 900 and is preferably implemented by any commercially available CPU ("Central Processing Unit"), DSP ("Digital Signal Processor") or any other electronic programmable logic device. The controller 910 is configured to read instructions from a memory 940 and execute these instructions to control the operation of the wireless communication device 900. The memory 940 may be implemented using any commonly known technology for computer-readable memories such as ROM, RAM, SRAM, DRAM, CMOS, FLASH, DDR, SDRAM or some other memory technology. The memory 940 is used for various purposes by the controller 910, one of them being for storing application data and program instructions 750 for software which defines the device's 900 operating as a beacon transmitting device.

The wireless communication device 900 further comprises wireless communication means 930, which is adapted to allow the wireless communication device 900 to communicate with other devices. More specifically, the wireless communication means 930 comprises at least a first communication interface 932 which supports short-range wireless beacon broadcast messaging and may, advantageously, be implemented as an iBeacon® and/or Bluetooth Low Energy (BLE)/Bluetooth 4.0 compliant communication interface. The first communication interface 932 may implement the short-range wireless beacon transmitter as referred to previously in this document.

The wireless communication means 930 may also comprise a second communication interface 934 for communicating with a server like the system server SS and/or the service provider SP via the communication network NW. The second communication interface 934 will receive the refresh control data RCD when applicable and may, advantageously, be implemented as a communication interface compliant with IEEE 802.11, IEEE 802.15, ZigBee, WirelessHART, WiFi, Bluetooth®, WCDMA, HSPA, GSM, UTRAN, UMTS, and LTE, to name a few.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 8:
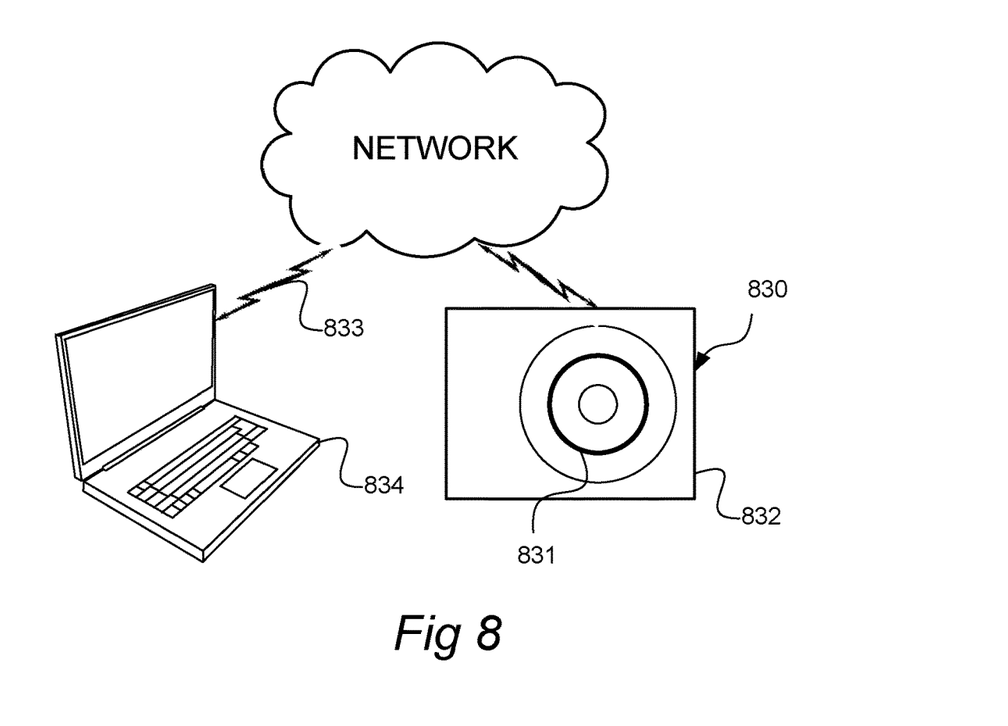
FIG. 8 is a schematic view of a computer-readable medium.

FIG. 8 shows a schematic view of a computer-readable medium as described in the above. The computer-readable medium 830 is in this embodiment a data disc 830. In one embodiment the data disc 830 is a magnetic data storage disc. The data disc 830 is configured to carry instructions 831 that when loaded into a controller, such as a processor, executes a method or procedure according to the embodiments disclosed above. The data disc 830 is arranged to be connected to or within and read by a reading device 832, for loading the instructions into the controller. One such example of a reading device 832 in combination with one (or several) data disc(s) 830 is a hard drive. It should be noted that the computer-readable medium can also be other media such as compact discs, digital video discs, flash memories or other memory technologies commonly used.

The instructions 831 may also be downloaded to a computer data reading device 834, such as a laptop computer or other device capable of reading computer coded data on a computer-readable medium, by comprising the instructions 831 in a computer-readable signal 833 which is transmitted via a wireless (or wired) interface (for example via the Internet) to the computer data reading device 834 for loading the instructions 831 into a controller. In such an embodiment the computer-readable signal 833 is one type of a computer-readable medium 830. The instructions may be stored in a memory (not shown explicitly in FIG. 8, but referenced as 740 in FIG. 8) of the computer data reading device 834.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The various functionality described in this document may be performed in part or fully in a wireless communication device 700 or 900 comprising a controller as disclosed above with reference to FIGS. 6A, 6B, 7 and 9, and/or caused to be performed by executing instructions stored on a computer-readable medium as disclosed with reference to FIG. 8.

The location of applications programs, or apps, as referred to in this document with respect to a hierarchical software model is not critical; hence, they may be located at an application layer or alternatively at a lower layer, such as for instance being part of an operating system.

Even though the embodiments described above are based on beacon systems where a beacon region is represented by a universally unique identifier (UUID), the invention may be applied also to other types of beacon systems. For instance, the invention may be applied to beacon system like AltBeacon, URIBeacon and Eddystone, which do not use a UUID but another form of identity (such as a tiny URL) in the 31-byte GAP BLE packet for the beacon signal.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A beacon communication system comprising a plurality of beacon transmitter devices, each beacon transmitter device comprising a controller and a short-range wireless beacon transmitter, the controller being configured to cause a first transmission of a short-range wireless beacon signal by the beacon transmitter, the beacon signal identifying a beacon region, wait during a beacon delay time period, and cause a second transmission of the short-range wireless beacon signal by the beacon transmitter, wherein the first transmission of the short-range wireless beacon signal causes a short-range wireless beacon receiver device, when being in a passive mode, being in range of the beacon region and receiving the first transmission of the beacon signal, to:
  report to an external device that it has entered into the beacon region,
  then enter into a deafened-out state in which the beacon receiver device will not be capable of reacting to subsequent transmissions of the beacon signal,
  then once the deafened-out state has ended report an exit event to the external device;
  and wherein the beacon delay time period is defined to last at least as long as the deafened-out state of the beacon receiver device, the beacon delay time period being sufficiently long to allow the short-range wireless beacon receiver device, when being in the passive mode, being in range of the beacon region and having received the first transmission of the beacon signal, to receive and react on the second transmission of the beacon signal, wherein
  the first transmission of the short-range wireless beacon signal, the waiting during the beacon delay time period, and the second transmission of the short-range wireless beacon signal occur essentially concurrently at the respective beacon transmitter devices, each beacon transmitter device having a communication interface for data communication, and wherein:

the controller of each beacon transmitter device is further configured to:
- obtain a current time value from either a local clock provided in the beacon transmitter device or an external time keeping service accessible via the communication interface;
- determine whether the obtained time value indicates that at least a time corresponding to the beacon delay time period has elapsed since the first transmission of the short-range wireless beacon signal by the beacon transmitter; and
- if the determination is affirmative, cause the second transmission of the short-range wireless beacon signal by the beacon transmitter.

2. The beacon communication system according to claim 1, wherein the beacon delay time period is defined to be at least equal to an expected duration it would take for the short-range wireless beacon receiver device, after having received the first transmission of the beacon signal, to become capable of receiving and reacting on the second transmission of the beacon signal.

3. The beacon communication system according to claim 1, wherein the controller is configured to operate on a periodic basis, such that after the transmission of the second transmission of the beacon signal, the controller waits during the beacon delay time period and then causes a third transmission of the short-range wireless beacon signal by the beacon transmitter, and so on.

4. The beacon communication system according to claim 1, wherein the controller of each beacon transmitter device is configured, when the determination is affirmative, to terminate the beacon delay time period and thus cause the second transmission of the short-range wireless beacon signal by the beacon transmitter.

5. A beacon communication system comprising a plurality of beacon transmitter devices, each beacon transmitter device comprising a controller and a short-range wireless beacon transmitter, the controller being configured to cause a first transmission of a short-range wireless beacon signal by the beacon transmitter, the beacon signal identifying a beacon region, wait during a beacon delay time period, and cause a second transmission of the short-range wireless beacon signal by the beacon transmitter, wherein the first transmission of the short-range wireless beacon signal causes a short-range wireless beacon receiver device, when being in a passive mode, being in range of the beacon region and receiving the first transmission of the beacon signal, to:
- report to an external device that it has entered into the beacon region,
- then enter into a deafened-out state in which the beacon receiver device will not be capable of reacting to subsequent transmissions of the beacon signal,
- then once the deafened-out state has ended report an exit event to the external device;

and wherein the beacon delay time period is defined to last at least as long as the deafened-out state of the beacon receiver device, the beacon delay time period being sufficiently long to allow the short-range wireless beacon receiver device, when being in the passive mode, being in range of the beacon region and having received the first transmission of the beacon signal, to receive and react on the second transmission of the beacon signal, wherein the first transmission of the short-range wireless beacon signal, the waiting during the beacon delay time period, and the second transmission of the short-range wireless beacon signal occur essentially concurrently at the respective beacon transmitter devices, the beacon communication system further comprising an external device, each beacon transmitter device having a communication interface for data communication, wherein:

the external device is configured to periodically send beacon transmission synchronization signals to the beacon transmitter devices; and wherein the controller of each beacon transmitter device is further configured to:
- receive a first beacon transmission synchronization signal from the external device via the communication interface;
- cause the first transmission of the short-range wireless beacon signal by the beacon transmitter;
- receive a second beacon transmission synchronization signal from the external device via the communication interface; and
- cause the second transmission of the short-range wireless beacon signal by the beacon transmitter.

6. The beacon communication system according to claim 5, wherein the beacon delay time period is defined to be at least equal to an expected duration it would take for the short-range wireless beacon receiver device, after having received the first transmission of the beacon signal, to become capable of receiving and reacting on the second transmission of the beacon signal.

7. The beacon communication system according to claim 5, wherein the controller is configured to operate on a periodic basis, such that after the transmission of the second transmission of the beacon signal, the controller waits during the beacon delay time period and then causes a third transmission of the short-range wireless beacon signal by the beacon transmitter, and so on.

8. The beacon communication system according to claim 5, wherein the controller of each beacon transmitter device is configured, in response to receiving the second beacon transmission synchronization signal, to terminate the beacon delay time period and thus cause the second transmission of the short-range wireless beacon signal by the beacon transmitter.

* * * * *

UNITED STATES PATENT AND TRADEMARK OFFICE
CERTIFICATE OF CORRECTION

PATENT NO. : 10,551,472 B2  
APPLICATION NO. : 15/778389  
DATED : February 4, 2020  
INVENTOR(S) : Joachim Samuelsson Page 1 of 1

It is certified that error appears in the above-identified patent and that said Letters Patent is hereby corrected as shown below:

On the Title Page

Item (73), the Assignee listed is "CRUNCHFISH AB", should read --CRUNCHFISH PROXIMITY AB--.

Signed and Sealed this  
Second Day of June, 2020

Andrei Iancu  
*Director of the United States Patent and Trademark Office*